United States Patent Office 3,457,238
Patented July 22, 1969

3,457,238
PROCESS OF PREPARING POLYETHYLENE TEREPHTHALATE USING ALKALI METAL THIOCYANATE OR ALKALINE EARTH METAL THIOCYANATE DIRECT ESTERIFICATION ADDITIVES
Mary E. Carter, Philadelphia, John A. Price, Swarthmore, Pa., assignors to FMC Corporation, Philadelphia, Pa., a corporation of Delaware
No Drawing. Filed Nov. 23, 1966, Ser. No. 596,436
Int. Cl. C08g 17/013
U.S. Cl. 260—75                     8 Claims This invention relates to a method of preparing filament-forming polyesters. More particularly, it relates to the preparation of polyethylene terephthalate resin having excellent filament-forming properties.

The manufacture of polyester resin by polycondensation of the product formed by the direct esterification of a dicarboxylic acid and a diol, is well-known. In the case of polyethylene terephthalate, the direct esterification procedure has not been generally accepted for the commercial preparation of the polymer because of the difficulty, when using it, in preparing a satisfactory melt spinnable resin. The polyethylene terephthalate resin should have a carbonyl content value of below 50 equivalents per million grams (eq./$10^6$ gr. or maq./kg.), a minimum birefringent melting point of 258° C., and an intrinsic viscosity of greater than 0.60. Each of these resin characteristic requirements is necessary to provide a material which can be melt extruded to form filaments and fibers which can be processed to form substantially colorless, stable, high tenacity textile products.

Furthermore, from a commercial standpoint, it is desirable to produce polyester resin having acceptable properties in a process which takes the shortest possible time to complete.

It is an object of the present invention to prepare polyethylene terephthalate resin suitable for melt extrusion into non-degraded, processable filaments by a direct esterification and polycondensation procedure.

This and other objects are accomplished in accordance with this invention which concerns a method of preparing filament-forming polyethylene terephthalate wherein terephthalic acid and ethylene glycol are directly esterified and the product of esterification is polycondensed in the presence of a condensation catalyst, the improvement comprising carrying out the direct esterification step in the presence of an alkali metal or alkaline earth metal thiocyanate in an amount sufficient to improve the properties of the resulting polyester.

In general, the direct esterification stage of this invention is carried out with the molecular ratio of glycol to acid of from about 1:1 to about 15:1, but preferably from about 1.2:1 to 2.5:1. The esterification reaction temperature ranges from about 220 to about 290° C. and the reaction is carried out in the absence of an oxygen containing gas at atmospheric or elevated pressure. The catalytic amount of thiocyanate present during the esterification reaction generally ranges from about $5 \times 10^{-6}$ to about $5 \times 10^{-2}$ mole per mole of terephthalic acid.

When the direct esterification stage is complete, as indicated, for example, by the collection of clear distillate, any remaining glycol is distilled off and a polycondensation catalyst is added to the product and condensation is continued under vacuum.

Conventional polycondensation catalysts include, for example, antimony trioxide, antimony pentoxide, antimony trisulfide, antimony trifluoride, antimony triphenyl, zinc acetylacetonate, lead oxide, sodium alcoholate, lithium hydride, zinc acetate, ferric acetate, titanium oxide, organo-tin compounds, organo-magnesium halides, and the like. These compounds may be added at the completion of the esterification reaction or before. They are generally employed in amounts ranging from about 0.005 to about 0.5% based on the weight of the reactants. The condensation reaction is usually carried out at a reduced pressure of from about 0.1 to 20 mm. of mercury and a temperature of from about 230 to 320° C. in an inert atmosphere.

The process of this invention may be carried out either continuously or batch-wise.

The following example is set forth to demonstrate this invention.

Example

A mixture containing 84 g. (0.5 mole) of terephthalic acid, 62 g. (1.0 mole) of ethylene glycol, and 0.0033 g. ($5 \times 10^{-5}$ mole) of an alkali metal or alkaline earth metal thiocyanate was charged to a Fischer-Porter pressure assembly equipped with a nitrogen sparge tube and a distilling arm. The reactor was lowered into an oil bath maintained at 260° C. and flushed for 10 minutes with dry nitrogen. A nitrogen pressure of 60 p.s.i. was applied and a distillate of water-ethylene glycol was collected. When a clear liquid, i.e. solution, was obtained, the pressure was reduced to atmospheric and the remaining excess glycol was distilled. The low molecular weight polymer (prepolymer) was further reacted in the presence of a condensation catalyst e.g. antimony trioxide or antimony trisulfide, to a high molecular weight polyester under vacuum for four hours at 282° C. The polycondensation catalyst concentration was 0.04% based on the weight of the prepolymer.

The following table sets forth conditions and results of various reactions carried out as described above.

TABLE

| Esterification additive | Esterification time, hrs.:min. | Prepolymer carboxyl content, meq./kg. | Condensation catalyst | Intrinsic viscosity | Melting pt., °C. | Polymer carboxyl content, meq./kg. |
|---|---|---|---|---|---|---|
| None | 3:40 | 316 | None | 0.36 | 261 | 32 |
| Do | 3:40 | 316 | $Sb_2O_3$ | 0.80 | 250 | 40 |
| Barium thiocyanate | 3:00 | 265 | $Sb_2O_3$[1] | 0.67 | 265 | 22 |
| Calcium thiocyanate | 2:30 | 175 | $Sb_2O_3$ | 1.03 | 260 | 28 |
| Lithium thiocyanate | 3:00 | 140 | $Sb_2S_3$ | 0.92 | 262 | 25 |
| Sodium thiocyanate | 2:30 | 32 | $Sb_2S_3$ | 0.65 | 260 | 27 |

[1] Condensation time for this run was 2½ hours instead of four hours.

The above table indicates that the thiocyanates of alkali metals and alkaline earth metals when used as esterification catalysts consistently produce better polymers in accordance with this invention, than reactions wherein no esterification catalyst is used. Furthermore, in general, the use of the additive cuts esterification time considerably and produces prepolymers which are more highly esterified. The esterification additive provides a prepolymer which may be polycondensed to a high molecular weight, low diethylene glycol content polymer, as indicated by its high intrinsic viscosity and melting point.

The testing used to determine the above resin characteristics were uniformly carried out using conventional procedures.

Various changes and modifications may be made practicing the invention without departing from the spirit and scope thereof and, therefore, the invention is not to be limited except as defined in the appended claims.

We claim:

1. A method for preparing filament-forming polyethylene terephthalate wherein terephthalic acid and ethylene glycol are directly esterified and the product of esterification is condensed in the presence of a condensation catalyst, the improvement comprising carrying out the esterification reaction in the presence of a catalytic amount of an alkali metal thiocyanate or alkaline earth metal thiocyanate direct esterification catalytic additive.

2. The method of claim 1 wherein the thiocyanate is present in an amount ranging from about $5 \times 10^{-6}$ to about $5 \times 10^{-2}$ mole per mole of terephthalic acid.

3. The method of claim 1 wherein the esterification reaction is carried out in the presence of an alkali metal thiocyanate.

4. The method of claim 3 wherein the alkali metal is sodium.

5. The method of claim 3 wherein the alkali metal is lithium.

6. The method of claim 1 wherein the esterification reaction is carried out in the presence of an alkaline earth metal thiocyanate.

7. The method of claim 6 wherein the alkaline earth metal is calcium.

8. The method of claim 6 wherein the alkaline earth metal is barium.

References Cited

UNITED STATES PATENTS 3,326,965  6/1967  Schultheis et al. _____ 260—475

WILLIAM H. SHORT, Primary Examiner

LOUISE P. QUAST, Assistant Examiner

U.S. Cl. X.R.

260—475

PO-1050
(5/69)

UNITED STATES PATENT OFFICE
CERTIFICATE OF CORRECTION

Patent No. 3,457,238          Dated July 22, 1969

Inventor(s) Mary E. Carter and John A. Price

It is certified that error appears in the above-identified patent and that said Letters Patent are hereby corrected as shown below:

Column 1, line 25, "carbonyl" should read --carboxyl--; line 26, "maq./kg." should read --meq./kg.--.

SIGNED AND
SEALED

NOV 4 1969

(SEAL)
Attest:

Edward M. Fletcher, Jr.
Attesting Officer

WILLIAM E. SCHUYLER, JR.
Commissioner of Patents